United States Patent
Han et al.

(10) Patent No.: US 11,370,658 B2
(45) Date of Patent: Jun. 28, 2022

(54) METHOD FOR THE PREPARATION OF AMMONIA SYNTHESIS GAS

(71) Applicant: Haldor Topsøe A/S, Kgs. Lyngby (DK)

(72) Inventors: Pat A. Han, Smørum (DK); Annette E. Krøll Jensen, Fredensborg (DK)

(73) Assignee: Topsoe A/S, Kgs. Lyngby (DK)

( * ) Notice: Subject to any disclaimer, the term of this patent is extended or adjusted under 35 U.S.C. 154(b) by 224 days.

(21) Appl. No.: 16/622,068

(22) PCT Filed: Jul. 11, 2018

(86) PCT No.: PCT/EP2018/068802
§ 371 (c)(1),
(2) Date: Dec. 12, 2019

(87) PCT Pub. No.: WO2019/020376
PCT Pub. Date: Jan. 31, 2019

(65) Prior Publication Data
US 2021/0198104 A1 Jul. 1, 2021

(30) Foreign Application Priority Data
Jul. 25, 2017 (DK) .......................... PA 2017 00425

(51) Int. Cl.
*C01B 3/02* (2006.01)
*C01B 3/48* (2006.01)
*C01B 3/50* (2006.01)
*C01C 1/04* (2006.01)
*C25B 1/04* (2021.01)
*C25B 15/08* (2006.01)

(52) U.S. Cl.
CPC ................ *C01B 3/025* (2013.01); *C01B 3/48* (2013.01); *C01B 3/506* (2013.01); *C01C 1/0405* (2013.01); *C25B 1/04* (2013.01); *C25B 15/08* (2013.01); *C01B 2203/0244* (2013.01); *C01B 2203/0283* (2013.01); *C01B 2203/046* (2013.01); *C01B 2203/0475* (2013.01); *C01B 2203/068* (2013.01); *C01B 2203/1235* (2013.01)

(58) Field of Classification Search
CPC .......... C01B 3/382; C01B 3/025; C01B 3/48; C01B 2203/068; C01B 2203/048; C01B 2203/0244; C01B 2203/0283; C01B 2203/0465; C01B 2203/0475; C01B 2203/0233
See application file for complete search history.

(56) References Cited

U.S. PATENT DOCUMENTS

| | | |
|---|---|---|
| 4,197,281 A | 4/1980 | Muenger et al. |
| 2009/0165459 A1 | 7/2009 | Henriksen et al. |
| 2010/0076097 A1 | 3/2010 | Metz et al. |
| 2012/0100062 A1 | 4/2012 | Nakamura et al. |
| 2013/0345325 A1 | 12/2013 | Lecomte et al. |
| 2015/0014596 A1 | 1/2015 | Filippi et al. |

FOREIGN PATENT DOCUMENTS

| | | |
|---|---|---|
| EP | 2 589 574 A1 | 5/2013 |
| WO | WO 2015/067436 A1 | 5/2015 |

*Primary Examiner* — Jafar F Parsa
(74) *Attorney, Agent, or Firm* — Blank Rome LLP

(57) ABSTRACT

Method for the preparation of ammonia synthesis gas by a combination of ATR or secondary reforming process using oxygen from an air separation unit and electrolysis of water for the production of ammonia synthesis gas.

5 Claims, No Drawings

METHOD FOR THE PREPARATION OF AMMONIA SYNTHESIS GAS

The present invention is directed to the preparation of ammonia synthesis gas. More particular, the invention combines air separation, electrolysis of water and partial oxidation of a gaseous hydrocarbon feed stock in the preparation of a hydrogen and nitrogen containing ammonia synthesis gas.

Ammonia synthesis gas is conventionally prepared by subjecting hydrocarbon feed of natural gas or higher hydrocarbons to endothermic steam reforming reactions in a fired tubular steam reformer by contact with a steam reforming catalyst. The primary reformed gas is then fed into a secondary adiabatic reformer, wherein part of hydrogen and residual amounts of hydrocarbons in the gas are partial oxidized with air or oxygen enriched air in presence of a secondary reforming catalyst. From the secondary reformer, raw synthesis gas containing hydrogen, nitrogen, carbon monoxide and carbon dioxide formed during reaction of the feedstock in the above steam reforming reactions and nitrogen introduced into the gas through addition of air in the secondary reforming step.

The disadvantage of the primary and secondary reforming process is a relatively high hydrocarbon feed stock and fuel consumption for use in heating the endothermic primary steam reforming and consequently large $CO_2$ emission. The $CO_2$ product being captured from the process can be used for downstream processes such as urea production or enhanced oil recovery.

The primary and secondary steam reforming can in large scale ammonia synthesis plant be replaced by autothermal reforming (ATR).

However, primary and secondary steam reforming is still frequently employed in the industry, particularly in existing reforming plants.

ATR comprises partial oxidation using oxygen in a reaction with natural gas to CO, $CO_2$, $H_2$, $H_2O$ and hydrocarbon and subsequently steam reforming of the hydrocarbon to form raw synthesis gas. With ATR technology, the specific hydrocarbon consumption can be reduced slightly as well as the $CO_2$ emission.

In the ATR process, an Air Separation Unit (ASU) supplies oxygen for the ATR and nitrogen for the ammonia synthesis as well.

Less than half of the nitrogen being processed in the ASU will be used for the ammonia synthesis because the ATR demands relatively more oxygen than nitrogen than the ratio between oxygen and nitrogen in atmospheric air. Excess nitrogen can be considered as energy loss from the ASU.

Recently, a combination of electrolysis of water for production of hydrogen and air separation for the production of nitrogen has been envisaged for the preparation of ammonia synthesis gas, at least in patent literature. The thus produced hydrogen and nitrogen are combined in stoichiometric ratios to form synthesis gas for ammonia production. The problem with the combination of electrolysis and air separation is, however, that oxygen is produced as by-product in both electrolysis and air separation, which has no use in the ammonia synthesis, and can be considered as energy loss.

The present invention is based on a combination of the ATR process or the secondary reforming process using oxygen from an air separation unit and the electrolysis of water for the production of ammonia synthesis gas.

Thus, this invention is a method for the preparation of ammonia synthesis gas comprising the steps of (a) providing a gaseous hydrocarbon feed stock;

(b) separating atmospheric air into a separate oxygen containing stream and into a separate nitrogen containing stream;

(c) preparing a separate hydrogen containing stream and a separate oxygen containing stream by electrolysis of water;

(d) autothermal reforming or secondary reforming at least a part of the gaseous hydrocarbon feed stock with the oxygen containing stream obtained by the separation of atmospheric air in step (b) and the oxygen containing stream obtained by the electrolysis of water in step (c) to a process gas comprising hydrogen, carbon monoxide and carbon dioxide;

(e) treating the process gas withdrawn from the autothermal reforming or secondary reforming step (d) in one or more water gas shift reactions;

(f) removing the carbon dioxide from the water gas shift treated process gas;

(g) purifying the process gas from step (f) to obtain a purified hydrogen stream; and (h) introducing the nitrogen containing stream obtained by the separation of atmospheric air in step (b) into the purified hydrogen stream in an amount to provide a molar ratio of the hydrogen to the nitrogen of 2.7-3.3 in the mixed hydrogen and nitrogen gas stream to obtain the ammonia synthesis gas.

Purification of the process gas obtained in the autothermal reforming step can be performed by subjecting the gas to water gas shift reaction of CO to $CO_2$ for more hydrogen production and $CO_2$ removal with a liquid solvent being rich in potassium carbonate or amine and thereby selectively absorbing carbon dioxide in the liquid solvent as known in the art.

Compared to prior art methods using electrolysis of water for hydrogen production and air separation for nitrogen production, the oxygen product from electrolysis of water and from air separation is advantageously used for partial oxidation in the autothermal reformer or secondary reformer resulting in a reduced size of the ASU, which is a costly and energy intensive unit and process. For minimizing energy loss of the ASU, the size of the ASU can be reduced to a level where just sufficient amounts of nitrogen are produced as required in the ammonia synthesis. When the stoichiometric ratio of hydrogen and nitrogen for ammonia synthesis is produced in the ATR or secondary reforming and water electrolysis, the ASU size will be at its minimum and thus will not vent any excess of nitrogen.

However, depending on the availability of power for water electrolysis and the efficiency of the water electrolysis, the design of the ASU can be changed to provide oxygen in excess, in order to substitute a part of the hydrocarbon feedstock with hydrogen produced by the water electrolysis.

Still an advantage of the invention is that energy for operating the electrolysis unit and ASU can be renewable energy generated by windmills, solar cells, hydraulic energy or other renewables.

Thus, in a preferred embodiment of the invention, the electrolysis of water and the separation of air is powered by renewable energy.

The method for air separation employed in the method according to the invention is preferably fractional distillation in a cryogenic air separation unit to provide nitrogen and oxygen. Alternatively, other methods such as membrane separation, pressure swing adsorption (PSA) and vacuum pressure swing adsorption (VPSA), can be used.

The advantage of using cryogenic air separation is that a part of the separated nitrogen is in liquid form. Liquid nitrogen is preferably used in step (g) in a nitrogen wash unit for the removal of methane, argon and carbon monoxide by-products from the reforming step.

After the liquid nitrogen wash the ammonia synthesis gas will then be essentially free of inerts and more efficient in the ammonia synthesis, in that purge gas can be avoided.

One of the major advantages of the method according to the invention is a considerably increased efficiency of the electrolysis unit by nearly 50%, compared to the efficiency in the prior art processes employing solely electrolysis and air separation, without ATR or secondary reforming.

Reported efficiencies of commercialized technologies for water electrolysis are between 40% to 60%. The efficiency of water electrolysis is defined as the Lower Heating Value (LHV) of hydrogen produced divided by the electrical power consumed. No energy value is given to oxygen produced since it has no thermodynamic heating value.

The synergy in combining water electrolysis and ATR or secondary reforming technology for ammonia synthesis gas production, results in overall savings of hydrocarbon feedstock and fuel for the partial oxidation process and reduced power savings in the ASU due its reduced size.

In Table 1 below, key figures are given for a 2200 MTPD ammonia plant for comparison of syngas technologies for ATR with ASU and ATR with ASU combined with water electrolysis.

TABLE 1

| Technology for syngas | Natural gas consumption, $Nm^3/h$ | ASU power consumption, MW | Power for electrolysis, MW | $CO_2$ footprint, $Nm^3/h$ |
|---|---|---|---|---|
| ATR with ASU | 65,506 | 30.3 | 0 | 79,700 |
| ATR with ASU & water electrolysis | 53,807 | 12.9 | 195.3 | 65,470 |

By means of the process according to the invention, when utilizing 195.3 MW power for water electrolysis with an efficiency of 50%, the saving of natural gas is 129 MW (LHV=39771 $KJ/Nm^3$) and 12.9 MW power for the ASU. The overall efficiency of the water electrolysis has then increased from 50% to 72.6%. That is nearly an increase of 50%.

Since the natural gas consumption has been reduced by 22% the $CO_2$ emission has been reduced correspondingly.

When used in revamp or for increasing capacity of ATR or primary and secondary reforming based ammonia synthesis gas plants, the method according to the invention provides the further advantages of reducing specific consumption of the hydrocarbon feed stock and as a result thereof production of $CO_2$. As known in the art, $CO_2$ must be removed from the ammonia synthesis gas in an upstream process by sour gas wash with amines or a potassium carbonate solution. That process is costly and reducing the amount of $CO_2$ in the raw ammonia synthesis gas reduces the overall process cost.

The invention claimed is:

1. A method for the preparation of ammonia synthesis gas comprising the steps of:
    (a) providing a gaseous hydrocarbon feed stock;
    (b) separating atmospheric air into a separate oxygen containing stream and into a separate nitrogen containing stream;
    (c) preparing a separate hydrogen containing stream and a separate oxygen containing stream by electrolysis of water;
    (d) autothermal or secondary reforming at least a part of the gaseous hydrocarbon feed stock with the oxygen containing stream obtained by the separation of atmospheric air in step (b) and the oxygen containing stream obtained by the electrolysis of water in step (c) to a process gas comprising hydrogen, carbon monoxide and carbon dioxide;
    (e) treating the process gas withdrawn from the autothermal or secondary reforming step (d) in one or more water gas shift reactions;
    (f) removing the carbon dioxide from the water gas shift treated process gas;
    (g) purifying the process gas from step (f) to obtain a purified hydrogen stream; and
    (h) introducing the nitrogen containing stream obtained by the separation of atmospheric air in step (b) into the purified hydrogen stream in an amount to provide a molar ratio of the hydrogen to the nitrogen of 2.7-3.3 in the mixed hydrogen and nitrogen gas stream to obtain the ammonia synthesis gas.

2. The method according to claim 1, wherein the separating of atmospheric air in step (b) and the electrolysis of water is powered by renewable energy.

3. The method according to claim 1, wherein the purified hydrogen stream in step (g) is obtained by a liquid nitrogen wash.

4. The method according to claim 1, wherein the separating of atmospheric air in step (b) is performed by cryogenic separation.

5. The method according to claim 1, wherein at least a part of the hydrogen containing stream from step (c) is added to the purified hydrogen stream in step (h).

* * * * *